(12) United States Patent
Choi

(10) Patent No.: US 7,401,021 B2
(45) Date of Patent: Jul. 15, 2008

(54) APPARATUS AND METHOD FOR VOICE MODULATION IN MOBILE TERMINAL

(75) Inventor: I-Won Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 662 days.

(21) Appl. No.: 10/191,409

(22) Filed: Jul. 10, 2002

(65) Prior Publication Data

US 2003/0014246 A1    Jan. 16, 2003

(30) Foreign Application Priority Data

Jul. 12, 2001    (KR)    ............................ 2001-0042019

(51) Int. Cl.
*G10L 13/06* (2006.01)
(52) U.S. Cl. ........................ 704/269; 704/278
(58) Field of Classification Search ................ 704/270, 704/272, 278, 269; 380/270; 84/609
See application file for complete search history.

(56) References Cited

U.S. PATENT DOCUMENTS

| | | | | |
|---|---|---|---|---|
| 4,100,374 A | * | 7/1978 | Jayant et al. .................. 380/28 |
| 5,113,449 A | * | 5/1992 | Blanton et al. ............... 704/261 |
| 5,327,521 A | * | 7/1994 | Savic et al. .................. 704/272 |
| 5,758,320 A | * | 5/1998 | Asano ........................ 704/258 |
| 5,765,134 A | * | 6/1998 | Kehoe ........................ 704/270 |
| 5,860,064 A | * | 1/1999 | Henton ....................... 704/260 |
| 5,889,223 A | * | 3/1999 | Matsumoto .................. 84/609 |
| 5,933,808 A | * | 8/1999 | Kang et al. .................. 704/278 |
| 5,963,907 A | * | 10/1999 | Matsumoto .................. 704/270 |
| 6,148,175 A | * | 11/2000 | Freedland ................... 455/3.06 |
| 6,229,897 B1 | * | 5/2001 | Holthaus et al. ............. 380/270 |
| 6,987,514 B1 | * | 1/2006 | Beresin et al. .............. 345/473 |
| 7,016,841 B2 | * | 3/2006 | Kenmochi et al. ........... 704/258 |

OTHER PUBLICATIONS

Jayant et al, "A Comparison of Four Methods for Analog Speech Privacy", Jan. 1981, IEEE Transactions, vol. Com-29, No. 1, pp. 18-23.*
Pedro Cano, Alex Loscos, Jordi Bonada, Maarten de Boer, Xavier Serra□□"Voice Morphing System for Impoersonating in Karaoke Applications"□□Aug. 27-Sep. 1, 2000, ICMC2000□□Proceedings of the 2000 International Computer Music Conference.*

* cited by examiner

*Primary Examiner*—Talivaldis Ivars Smits
*Assistant Examiner*—Eric Yen
(74) *Attorney, Agent, or Firm*—Ked & Associates, LLP

(57) ABSTRACT

An apparatus for voice modulation in a mobile terminal comprises: a voice input unit being inputted a voice of a subscriber and generating an analog voice signal; a voice modulation unit for modulating the generated analog voice signal; an audio processor for converting the modulated analog voice signal into a digital signal; and an mobile station modem (MSM) for processing the digital signal to be suitable for a wireless transmission. Therefore, the apparatus for voice modulation in a mobile terminal is able to protect the privacy of subscriber by modulating the voice of subscriber during speaking on the phone, and is able to prevent the telephone harassment. Also, the voice of subscriber can be modulated variously as voice in a cave, child voice, devil voice, man's voice, woman's voice, and user defined effect sound, etc., and therefore, the various desires of mobile terminal user can be satisfied.

2 Claims, 5 Drawing Sheets

APPARATUS AND METHOD FOR VOICE MODULATION IN MOBILE TERMINAL

BACKGROUND OF THE INVENTION

1. Field of the Invention

The present invention relates to a voice modulating apparatus, and particularly, to an apparatus and a method for voice modulation in a mobile communication terminal.

2. Description of the Background Art

Voice and sound is a kind of energy, that is, vibration generated from a source of sound delivered as making air as a medium. Physically, the sound has three elements such as the times of vibration, that is, frequency, amplitude, and duration. The voice of human being is a compound of sounds having various frequencies. Therefore, a pitch of the voice is not only decided by a size of the frequency, but a difference in tone by which various vowels and consonants are distinguished is generated by constitution of frequencies.

The human beings generate voice frequency of 100~400 Hz generally, and a frequency range that the human beings can hear is 15~20,000 Hz. The voices of human beings have their own properties, that is, different pitches and lengths of sound. Human brain remembers the differences, and therefore, the human beings can recognize the speaker only with his/her voice.

Voice modulation is to change the properties of voice intentionally.

FIG. 1 is a block diagram showing a general mobile terminal related to a voice processing.

As shown therein, the mobile terminal comprises: a voice input unit 10 being inputted the voice of subscriber and generating an analog voice signal; an audio processor 30 for converting the analog voice signal into a digital signal; and a mobile station modem (hereinafter, referred to as 'MSM') 40 processing the digital signal to be suitable for wireless transmission.

General operation of the mobile terminal will be described as follows.

The voice input unit 10 is a device for collecting and converting the voice of the subscriber, and the voice input unit 10 converts the collected subscriber's voice into an analog signal and transmits it to the audio processor 30. The audio processor 30 amplifies the converted analog signal, and converts the signal into a digital signal of pulse code modulation (PCM) data form. And the converted digital signal is transmitted to the MSM 40.

The MSM 40 convolutionally encodes the received digital signal so as to detect and correct an error in transmission, scrambles the signal in order to ensure the privacy, and generates an IQ signal by 4-phase modulating using a pair of pilot PN code. Then the IQ signal is converted into a radio frequency (RF) signal as passing through a predetermined procedure, and discharged wirelessly through an antenna.

The MSM 40 is a circuit performing same functions as those of a central processing unit (CPU) in a computer, comprises an encoder, an interleaver, a deinterleaver, a viterbi decoder, a mod/demodulator, and a vocoder, etc., and controls most functions processed in the mobile terminal.

As described above, the conventional voice processing unit puts an emphasis on preventing the modulation and deformation of voice, and restoring the voice similarly to the original sound in the process of converting the voice into the signal and the code. The conventional mobile terminal is faithful to its own objects, however, can not satisfy the various desires of the subscriber since it does not have the functions of voice modulation and intentional voice modulation by which the subscriber is able to be protected from telephone harassment.

SUMMARY OF THE INVENTION

Therefore, an object of the present invention is to provide an apparatus and a method for voice modulation in a mobile terminal which are able to provide mobile communication subscribers with a voice modulation function.

Another object of the present invention is to provide an apparatus and a method for voice modulation in a mobile terminal which are able to protect mobile communication subscribers from a telephone harassment, etc. .

To achieve these and other advantages and in accordance with the purpose of the present invention, as embodied and broadly described herein, there is provided an apparatus for voice modulation in a mobile terminal comprising: a voice input unit 10 for being inputted a voice of a subscriber and generating an analog voice signal; a voice modulation unit 20 for modulating the generated analog voice signal; an audio processor 30 for converting the modulated analog voice signal into a digital signal; and an MSM 40 for processing the digital signal to be suitable for a wireless transmission.

The voice modulation unit 20 comprises: a voice signal analyzer 22 for detecting a spectrum parameter and a pitch period from the generated voice signal; a memory 28 for storing a plurality of effect sounds; a signal property conversion unit 24 for loading an effect sound which is selected by the subscriber from the memory 28, and converting the detected spectrum parameter and the pitch period with reference to a spectrum parameter and pitch period of the loaded effect sound; and a modulation sound generation unit 26 for generating an analog signal according to the converted spectrum parameter and the pitch period.

Also, in order to achieve the objects of the present invention, there is provided a method for voice modulation in a mobile terminal comprising: a step of generating an analog voice signal by being inputted a voice of a subscriber; a step of modulating the generated analog voice signal; a step of converting the modulated voice signal into a digital signal; and a step of processing the digital signal to be suitable for wireless transmission.

The step of modulating the voice signal comprises: a step of detecting a predetermined signal property value from the generated voice signal (S2); a step of selecting an effect sound which will be applied to the voice modulation (S3); a step of loading the selected effect sound from a memory (S4), and converting the detected signal property value with reference to the signal property value of the loaded effect sound; and a step of generating a voice signal according to the converted signal property value.

If the subscriber wants to control the signal property value directly, the step of modulating voice signal comprises: a step of detecting a predetermined signal property value from a generated voice signal (S2); a step of inputting signal property value by a subscriber (S5); a step of converting the detected signal property value with reference to the inputted signal property value (S6); and a step of generating a voice signal according to the converted signal property value (S7).

In order to achieve the objects of the present invention, there is provided a second method for voice modulation according to the present invention comprising: a step of generating an analog voice signal by being inputted a voice of a subscriber (S11); a step of sampling the generated analog voice signal (S12); a step of modulating the voice of the subscriber by converting an instantaneous amplitude and pitch period of the sampled signal (S13); a step of converting the modulated voice signal into a digital signal (S14); and a step of processing the digital signal suitable for the wireless transmission.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
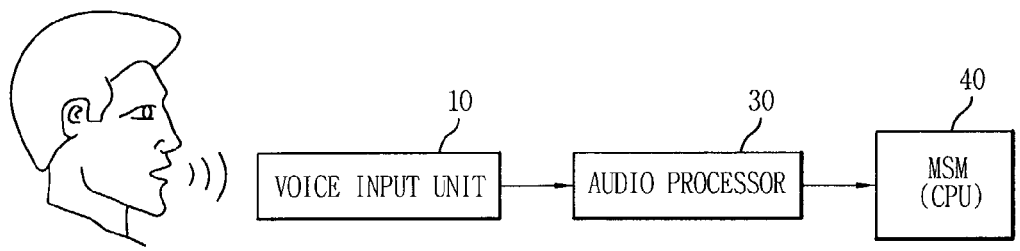
FIG. 1 is a block diagram showing a general mobile communication terminal related to a voice processing.
Figure 2:
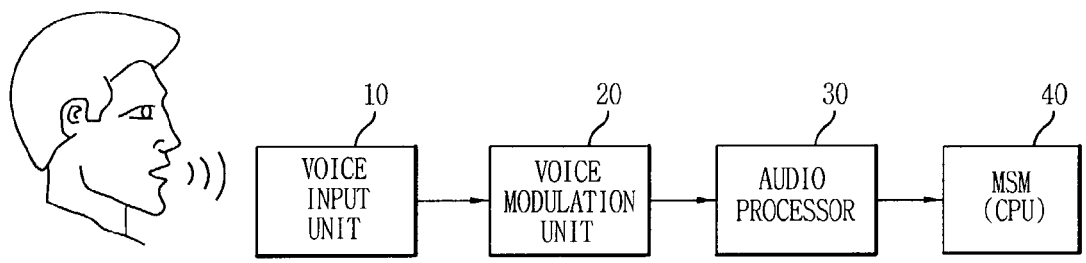
FIG. 2 is a block diagram showing a voice modulation apparatus in a mobile terminal according to the present invention.
Figure 3:
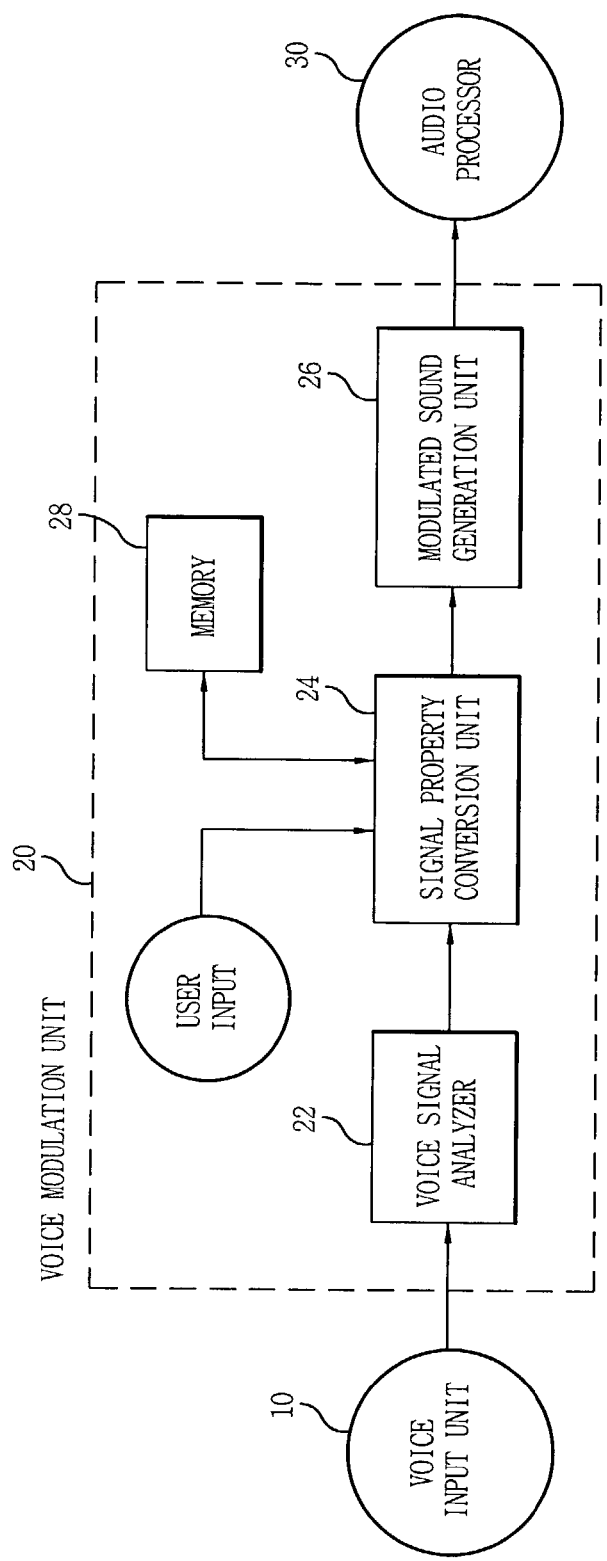
FIG. 3 is a flow chart describing an operation of a voice modulation unit shown in FIG. 2.

FIG. 2 is a block diagram showing an apparatus for voice modulation in a mobile terminal according to the present invention, and FIG. 3 is a flow chart describing an operation of a voice modulation unit shown in FIG. 2.

As shown in FIG. 2, the apparatus for voice modulation in a mobile terminal according to the present invention comprises: a voice input unit 10 for being inputted a voice of a subscriber and generating an analog voice signal; a voice modulation unit 20 for modulating the generated analog voice signal; an audio processor 30 for converting the modulated analog voice signal into a digital signal; and an MSM 40 for processing the digital signal to be suitable for wireless transmission.

As shown in FIG. 3, the voice modulation unit 20 comprises: a voice signal analyzer 22 for detecting a spectrum parameter and a pitch period from the generated voice signal; a memory 28 for storing a plurality of effect sounds; a signal property conversion unit 24 for loading an effect sound chosen by the subscriber, and converting the detected spectrum parameter and the pitch period with reference to the spectrum parameter and the pitch period of the loaded effect sound; and a modulated sound generation unit 26 for generating an analog signal according to the converted spectrum parameter and the pitch period.

The spectrum shows a size and a phase of respective frequency component constituting the analog voice signal in order of frequency size. The spectrum parameter is a value affecting to the size and the phase of the frequency component shown in the spectrum. In addition, the pitch means a fundamental frequency of vibration on vocal cord, and may be referred to as pitch period, basic period, or pitch frequency. The pitch period of men is 100~150 Hz, and the pitch period of women and children is 250~400 Hz.

Figure 4:
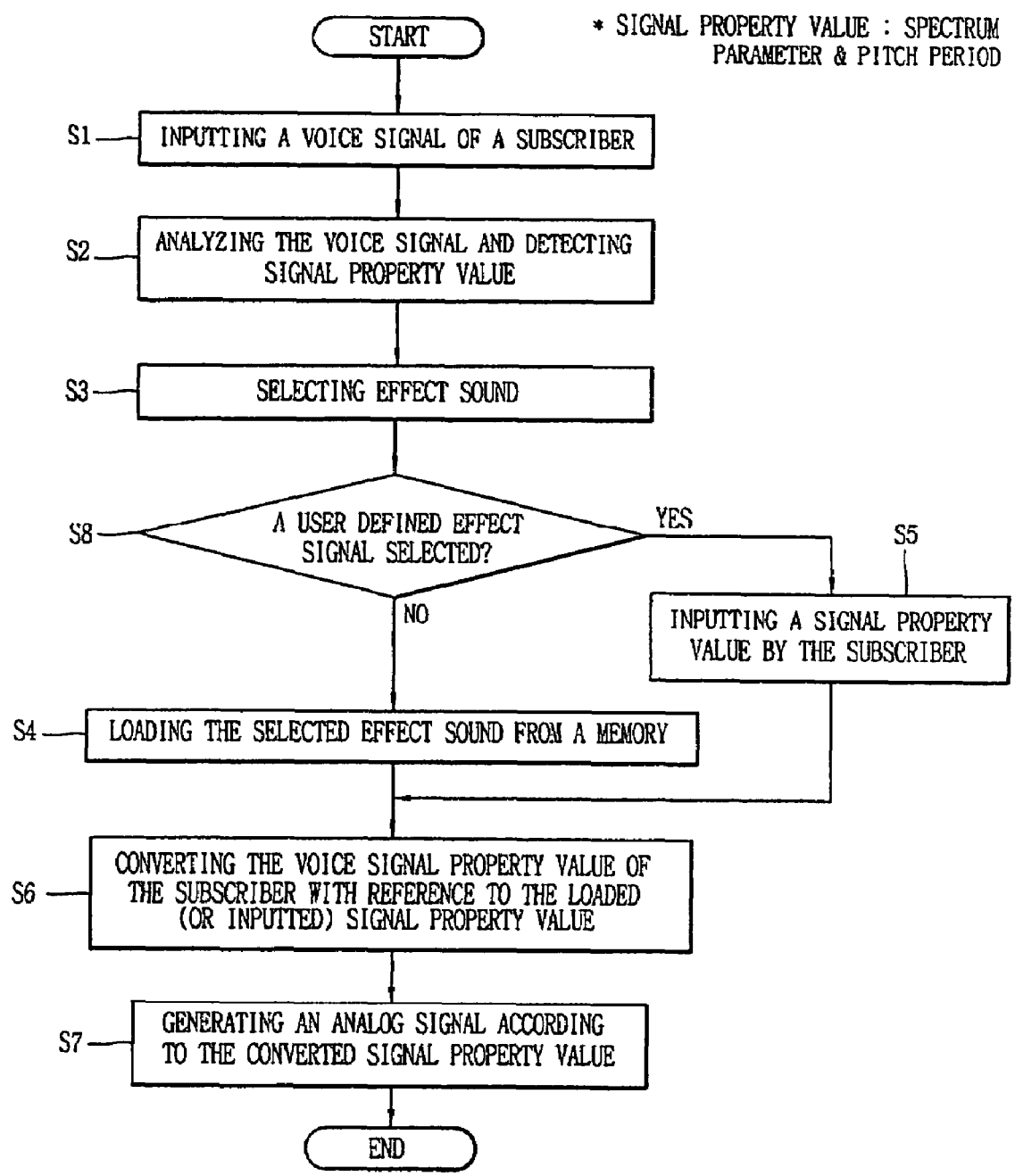
FIG. 4 is a flow chart describing a method for voice modulation in a mobile terminal according to the present invention.

FIG. 4 is a flow chart describing a method for voice modulation in the mobile terminal according to the present invention.

A method for voice modulation in a mobile terminal according to the present invention comprises: a step of generating an analog voice signal by being inputted a voice of the subscriber; a step of modulating the generated analog voice signal; a step of converting the modulated voice signal into a digital signal; and a step of processing the digital signal to be suitable for the wireless transmission.

The step of modulating the voice signal comprises: a step of detecting a predetermined signal property value from the generated voice signal (S2); a step of selecting an effect sound which will be applied to the voice modulation (S3); a step of loading the selected effect sound from a memory (S4), and converting the detected signal property value with reference to the signal property value of the loaded effect sound (S6); and a step of generating a voice signal according to the converted signal property value(S7).

If the subscriber wants to control the signal property value directly (S8), the step of modulating the voice signal comprises: a step of detecting a predetermined signal property value from a generated voice signal (S2); a step of inputting signal property value by a subscriber (S5); a step of converting the detected signal property value with reference to the inputted signal property value (S6); and a step of generating a voice signal according to the converted signal property value (S7).

The signal property value comprises the spectrum parameter and the pitch period.

The operation of the apparatus for voice modulation in the mobile terminal according to the present invention will be described as follows.

When the voice of the subscriber is inputted to the voice input unit 10 of the terminal, the voice input unit 10 converts the analog voice of the subscriber into the analog signal and transmits the signal to the voice modulation unit 20. In addition, the voice modulation unit 20 modulates the received analog signal, that is, the voice signal of the subscriber. The modulated voice signal of the subscriber is outputted to the audio processor 30.

The audio processor 30 amplifies the inputted analog signal. In addition, the audio processor 30 converts the signal into a digital signal of PCM data form and outputs it to the MSM 40. And the digital signal outputted to the MSM 40 is wirelessly discharged through general procedures.

FIG. 4 is an exemplary view showing a simple voice modulation.

The process of voice modulating will be described in more detail with reference to FIGS. 3 and 4.

When the voice signal of the subscriber is transmitted from the voice input unit 10, the voice signal analyzer 22 of the voice modulation unit 20 analyzes the received voice signal to detect the spectrum parameter and the pitch period of the subscriber's voice (S2).

When the spectrum parameter and the pitch period are detected, the subscriber selects the kind of the effect sounds (the voice in a cave, child voice, devil voice, man's voice, woman's voice, and user defined effect sound, etc.) (S3). When the effect sound is selected, the signal property conversion unit 24 loads the spectrum parameter and the pitch period value of the selected effect sound from the memory 28 (or look-up table) (S4). And the signal property conversion unit 24 converts the spectrum parameter and the pitch period of the subscriber's voice with reference to the loaded spectrum parameter and the pitch period (S6). That is, the effect sound and the subscriber's voice are mixed with each other. The conversion of the spectrum parameter affects the height of voice, and the conversion of pitch period affects the speed of voice.

The user defined effect sound means that the user (or subscriber) is able to modulate the voice by controlling the spectrum parameter and the pitch period directly, and the subscriber can modulate the voice of himself/herself variously through the user defined effect sound function.

When the spectrum parameter and the pitch period are converted through the above processes, the modulation sound generation unit 26 generates a voice signal according to the converted spectrum parameter and the pitch period and outputs the signal to the audio processor 30.

Figure 5:
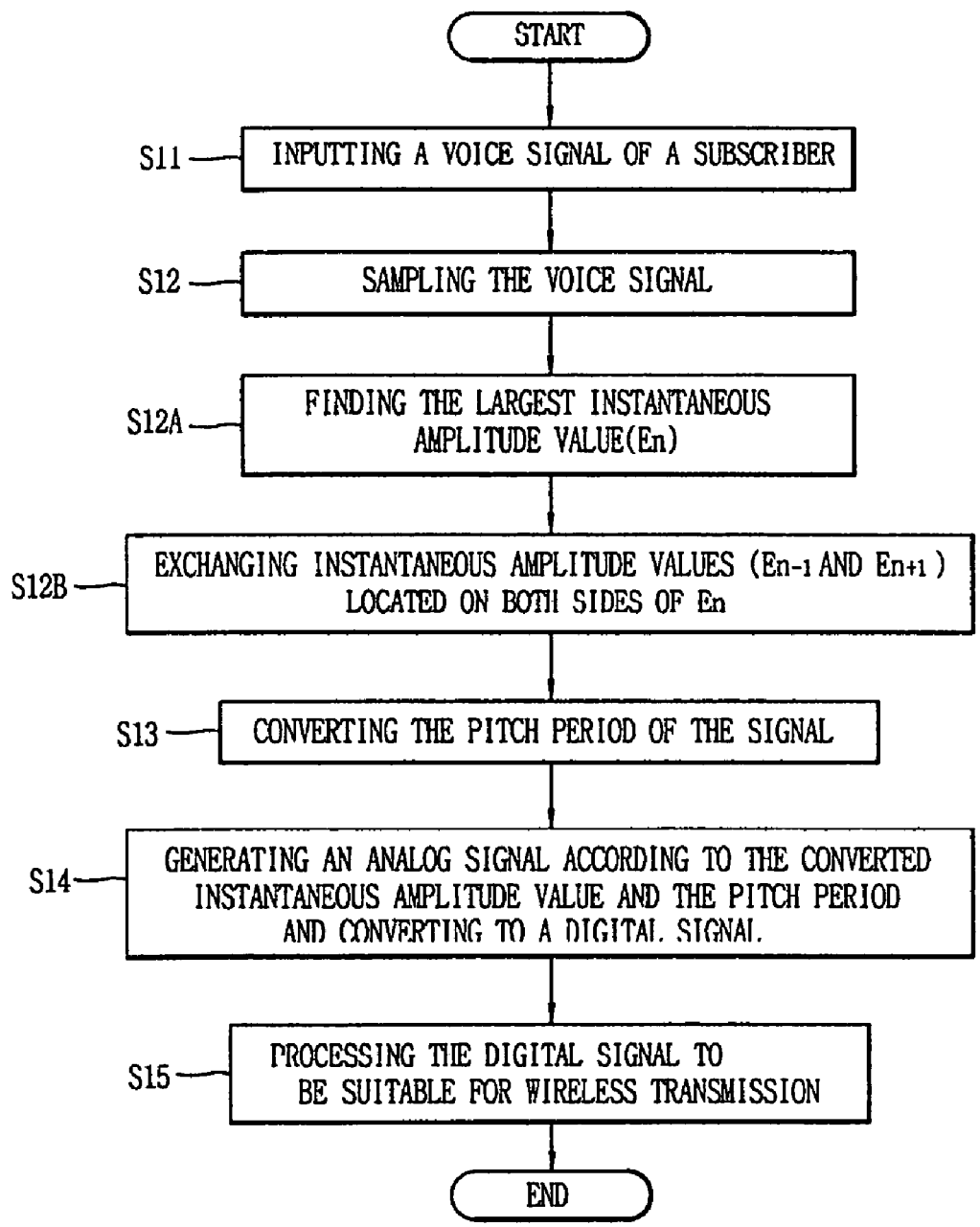
FIG. 5 is an exemplary view showing another voice modulation example.
Figure 6:
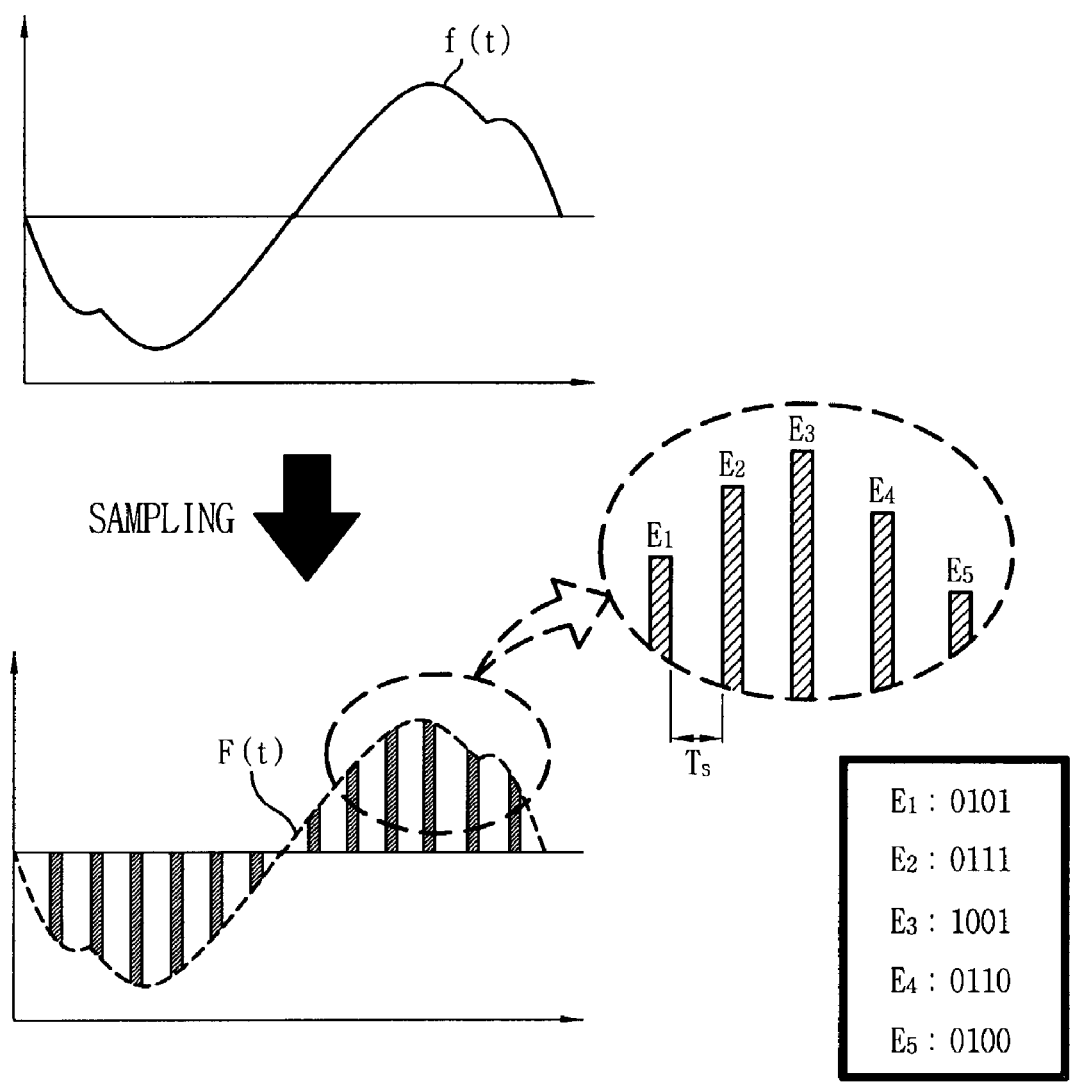
FIG. 6 is a view showing an analog voice signal f(t) and a sampled signal F(t).

FIG. 5 is a flow chart describing the second method for voice modulation according to the present invention, and FIG. 6 is a view showing an analog voice signal f(t) and a sampled signal F(t).

The second method for voice modulation comprises: a step of generating an analog voice signal (S11) by being inputted a voice of subscriber; a step of sampling the generated analog voice signal (S12); a step of modulating the voice of subscriber by converting the instantaneous amplitude value and the pitch period of the sampled signal (S13); a step of converting the modulated voice signal into a digital signal (S14); and a step of processing the digital signal to be suitable for the wireless transmission (S15).

The voice modulation is to distort the speaker's voice intentionally, however, the thoughts of the speaker should be transmitted even with the distorted voice. Therefore, it is important to change in the height and length of the sound as maintaining the basic properties of the voice.

The second method for voice modulation will be described as follows with reference to FIGS. 5 and 6.

It is assumed that the analog signal f(t) shown in FIG. 5 signalizes a voice of [æ] sound.

When the voice input unit 10 generates the analog voice signal f(t) by being inputted the voice of subscriber, and voice modulation unit 20 samples the generated voice signal f(t) with a predetermined time interval (Ts) (S11 and S12).

The voice modulation unit 20 finds the highest pulse among the pulses of the sampled signal F(t), that is, the largest instantaneous amplitude value E3 (S12A), and exchanges the instantaneous amplitude values E2 (0111) and E4 (0110) on both sides of the instantaneous amplitude value E3 (1001) (S12B). At the same time, the voice modulation unit 20 converts the pitch period value (S13).

The above process S13 is performed on every phoneme unit.

The phonemes make a syllable, and the syllables make a word. Therefore, if the voice of subscriber inputted into the voice input unit 10 is a word, the process S13 is repeated as the number of phonemes included in that word to modulate the word.

The voice modulation unit 20 generates the voice signal according to the converted instantaneous amplitude value and the pitch period value, and outputs it to the audio processor 30 (S14).

As described above, the apparatus for voice modulation in a mobile terminal according to the present invention is able to protect the privacy of subscriber by modulating the voice of subscriber during speaking on the phone, and is able to prevent the telephone harassment.

Also, the apparatus for voice modulation in the mobile terminal according to the present invention comprises an additional memory (or look-up table) which stores voice property values of effect sounds, and thereby, the time delay which may be generated during the voice modulation process can be minimized.

In addition, the voice of subscriber can be modulated variously as voice in a cave, child voice, devil voice, man's voice, woman's voice, and user defined effect sound, etc., and therefore, the various desires of mobile terminal user can be satisfied.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for voice modulation in a mobile terminal comprising:
   generating an analog voice signal after receiving a voice signal of a subscriber;
   sampling the generated analog voice signal;
   modulating the sampled voice signal of the subscriber by converting an instantaneous amplitude and pitch period of the sampled analog voice signal;
   converting the modulated voice signal into a digital signal; and
   processing the digital signal for compatibility for wireless transmission,
   wherein the modulating the sampled voice comprises:
      finding a largest instantaneous amplitude value $E_n$ in the sampled signal of respective phoneme;
      interchanging instantaneous amplitude values $E_{n-1}$ and $E_{n+1}$ adjacent to the largest instantaneous amplitude value $E_n$ located immediately before and immediately after on opposite sides, respectively, of the largest instantaneous amplitude value $E_n$;
      converting the pitch period of the signal; and
      generating an analog signal according to the converted instantaneous amplitude value and the pitch period value.

2. The method of claim 1, wherein the modulating the sampled voice signal is individually performed on all of the phoneme in the received voice signal of the subscriber.

* * * * *